United States Patent
Curry et al.

(10) Patent No.: US 6,558,165 B1
(45) Date of Patent: May 6, 2003

(54) ATTENTION-FOCUSING DEVICE AND METHOD OF USE

(75) Inventors: William J. Curry, Walpole, NH (US); Tom Deutschman, San Diego, CA (US); Jennifer Kelley, Cincinnati, OH (US)

(73) Assignee: Capticom, Inc., Walpole, NH (US)

( * ) Notice: Subject to any disclaimer, the term of this patent is extended or adjusted under 35 U.S.C. 154(b) by 0 days.

(21) Appl. No.: 09/953,416

(22) Filed: Sep. 11, 2001

(51) Int. Cl.[7] .............................................. G09B 19/00
(52) U.S. Cl. ...................................................... 434/236
(58) Field of Search ................................ 434/236, 237, 434/238; 128/921; 600/26, 27, 28

(56) References Cited

U.S. PATENT DOCUMENTS

| | | |
|---|---|---|
| 3,901,121 A | 8/1975 | Kleiner |
| 3,934,240 A | 1/1976 | Norling |
| 4,207,673 A | 6/1980 | DiGirolamo |
| 4,218,611 A | 8/1980 | Cannon |
| 4,888,748 A | 12/1989 | Lagasse et al. |
| 4,965,553 A * | 10/1990 | DelBiondo et al. ...... 340/573.1 |
| 4,975,682 A | 12/1990 | Kerr et al. |
| 4,995,018 A | 2/1991 | Edwards |
| 5,217,379 A * | 6/1993 | Kirschenbaum et al. .... 131/270 |
| 5,356,368 A * | 10/1994 | Monroe ........................ 600/28 |
| 5,357,487 A | 10/1994 | Coleman |
| 5,388,043 A | 2/1995 | Hettinger |
| 5,421,089 A | 6/1995 | Dubus et al. |
| 5,424,719 A | 6/1995 | Ravid |
| 5,563,850 A | 10/1996 | Hanapole |
| 5,673,691 A * | 10/1997 | Abrams et al. ............. 128/921 |
| 5,691,932 A | 11/1997 | Reiner et al. |
| 5,706,257 A | 1/1998 | Rothman et al. |
| 5,729,479 A | 3/1998 | Golan |
| 5,733,240 A * | 3/1998 | De Visser .................... 600/26 |
| 5,805,051 A | 9/1998 | Hermann et al. |
| 5,823,932 A * | 10/1998 | Speigel ........................ 600/26 |
| 5,908,301 A | 6/1999 | Lutz |
| 6,042,383 A * | 3/2000 | Herron ........................ 434/107 |
| 6,341,295 B1 * | 1/2002 | Stotler ........................ 708/131 |
| 2002/0028730 A1 * | 3/2002 | Kaufman ....................... 482/8 |
| 2002/0072959 A1 * | 6/2002 | Clendenon ................... 705/11 |

FOREIGN PATENT DOCUMENTS

| | | | |
|---|---|---|---|
| JP | 408129995 A | * | 5/1996 |
| JP | 411355870 A | * | 12/1999 |

OTHER PUBLICATIONS

Yeoman MR; Gray RW; Mitchell CJ; True S; Independent effects of palatability and within–meal pauses on intake and appetite ratings; Appetite; 1997; Aug.; 29 (1): 61–76.

Spiegel TA; Kaplan JM; Tomassini A; Stellar E; Bite size, ingestion rate and meal size in lean and obese women; Appetite; 1993; Oct.; 21 (2): 131–145.

* cited by examiner

Primary Examiner—John Edmund Rovnak
(74) Attorney, Agent, or Firm—David Pressman, Esq.

(57) ABSTRACT

An attention-focusing device (10) supplies sets of prompting signals for a plurality of related self-improvement regimens, and has a housing (12) of a structural form that fits within a closed hand, allows convenient portability, and camouflages use and purpose of device (10). The device has a visual sender (20) embedded within the housing (12) to shield the signal from direct observation by non-users, and an incurvate surface (22) formed in the housing (12) to further shield the visual sender (20) and provide a structural surface for kinesthetic contact. The circuitry (40) of the device (10) provides a mechanism for selectable visual, aural, or tactile signaling, gentle, non-coercive signals forms, a single switch (32) for selecting operational modes, and a microcontroller (42) that can be flexibly programmed to produce a plurality of temporally predetermined, sensibly distinct, repetitive signal sets that are operable individually or concurrently to implement multiple-objective programs, including several related self-improvement regimens for controlling human body weight.

20 Claims, 5 Drawing Sheets

ATTENTION-FOCUSING DEVICE AND METHOD OF USE

BACKGROUND

1. Field of Invention

The invention relates to the field of human self-improvement, specifically to an attention-focusing device and related methods of use to promote learning, mental reorganization, goal attainment, perceptual control, and behavioral modification.

2. Prior Art

Problematic human conditions such as obesity, addictions, stress-induced anger and anxiety, obsessive compulsions, phobias, and other inappropriate thoughts and urges are a source of great misery and ill health. Some corrective therapies for self-improvement incorporate attention-focusing devices that produce sensible repetitive timing signals to assist individuals in attaining new goals or learning new skills. A simple example is the use of a prompting device in a regimen to reduce nicotine addiction by providing prompting signals to extend the time interval between smoking cigarettes.

While specific repetitive signaling regimens vary according to the objective sought and the recommended technique, the process of supplying an individual with a sensible signal, such as a sound, is common to all approaches that are based, in part, on signaling. Human body weight control is a common self-improvement endeavor, but other self-help concerns are applicable.

The prior art reveals an extensive history of psychologically based methods and devices to control human food consumption and body weight. Some early behavioral modification programs proposed that eating slowly would prevent overeating. The supposition was that a person eating rapidly in an unrestrained fashion would tend to consume food in excess of metabolic needs before becoming aware of the body's satiety signals.

Some strategies advocated extending the interval between bites to slow food consumption and allow more time for post-ingestive satiety to develop. Audiotapes with timing cues and repetitive signaling timers were used by some programs to assist a user in increasing the interval between bites of food. Listening to audiotapes with bite timing cues in a social dining environment is unacceptably obtrusive.

Several behavioral modification signaling devices for use in "bite-pacing" programs are of record. For example, U.S. Pat. No. 5,421,089 to Dubus et al. (1995) and U.S. Pat. No. 4,207,673 to DiGirolamo et al. (1980) disclose special eating utensils with timing circuits in the handles that generate aural or visual signals for bite-pacing. The utensil-based devices are flagrantly conspicuous to all when moved about in hand with red and green lights flashing or buzzers sounding. Transporting a specialized eating utensil such as a bite-pacing fork in a pocket could be uncomfortable due to its shape, and unhygienic when soiled with food. These utensil-based devices also specify red-colored signaling lights that can be irritating.

Further, U.S. Pat. No. 5,563,850 to Hanapole (1996) shows a bite-pacing wristwatch with a motion-sensing triggering element that initiates a vibrating or electric shock signal for cueing bites. The wristwatch shocker is visually inconspicuous as described, but its external power source and connecting wire are obvious to fellow diners unless hidden within a dinner jacket. A separate battery pack and a connecting wire threaded through a coat sleeve are impractical and inconvenient. Moreover, the electrical shock is a coercive signal form.

Additionally, U.S. Pat. No. 4,975,682 to Kerr et al. (1990) discloses a "meal minder" device that requires the user to place an eating utensil atop a photocell sensor appliance between bites. An alarm sounds if the user removes the utensil from the photocell before the designated time interval has expired. The photocell device is blatantly apparent in use because of its substantial size and its awkward mode of operation and audible alarm. The meal minder device also lacks convenient portability due to its size and shape.

U.S. Pat. No. 5,908,301 to Lutz (1999) describes a behavioral modification device that can be user programmed to support a bite-pacing program. The Lutz behavioral modification device specifies a capability for discreet tactile signaling similar to a belt-located vibrating paging device, but such a signal delivery strategy is inappropriate for those women who would find it unfashionable or impossible to use with dresses lacking belts. The device includes a technically elaborate interface incorporating over ten adjustment switches. This complexity implies a steep learning curve that may deter technophobic users, and operating it could create an embarrassing disruption of the dining experience for many users. Some users find vibrating buzzing signals annoying.

The above appliances have serious human factor and operational deficiencies that inhibit their use and potential success as signaling devices for self-improvement programs. These limitations include the following:

Conspicuousness. Humans can be very sensitive about their body image, particularly when overweight. Actions that draw the attention of others to their personal appearance or to their self-improvement efforts can be a source of extreme embarrassment and humiliation. A signaling device that attracts undue attention or disrupts a social environment will be eschewed by users and deemed ineffective. Structural aspects contributing to conspicuousness of a device include size, shape, signal characteristics, location of use, ease of activation, and need for user involvement during operation. The above devices all have physical structures and operational methods that are obtrusive in use.

User-friendliness. A device that is perceived to be complex, aesthetically unattractive, inconvenient, or unpleasant to use will also be rejected. For example, devices that are awkward or uncomfortable to transport in pocket, purse, or hand will not be carried and available for use at all times. Those that employ coercive signal forms such as red lights (STOP!), irritating alarms, or electrical shocks risk creation of a negative user reaction. Complex signaling mechanisms or even those that appear complicated will deter those who are not technically oriented. The devices discussed above fail to meet reasonable standards of user-friendliness, and are aesthetically unappealing.

Operational Deficiencies. The above signaling devices suffer several operational inadequacies that limit their utility. For example, some multiple-regimen, self-improvement programs require a plurality of sensibly-distinct timing signal sets with different intervals. All of the cited mechanisms are single-purpose timing signaling devices (e.g., for bite-pacing), and do not support multiple-regimen programs.

Also, many self-improvement programs require predetermined signal timing intervals. Devices that describe circuitry with time-interval parameters that can be modified by a user pose a serious problem for implementing such regimens. User programmability is an undesirable feature that can circumvent program objectives. For example, Lutz allows user-adjustment of the signaling time interval, which is inappropriate for self-improvement regimens with predetermined intervals.

Attention-focusing devices are distinguished from other prior-art timers. One-shot timers, such as cooking timers and countdown stopwatches are well known, but they are not adapted for repetitive prompting. One-shot timers require human intervention for activation of each timing interval. Using such a device for repetitive prompting is inconvenient, distracting, embarrassing, wand indiscreet. Moreover, these devices as a class rely on strident audible alarms to indicate conclusion of a timing interval. Further, these timers include analog or digital display means and housing forms that publicize their intended use.

Pacing devices for athletes are also known. However, their location of use (wrist, lanyard, or handheld watches) and their audible alarms make them inappropriate for social settings. The intended uses of these pacers in athletic activities require user-programmability of pacing intervals. As discussed above, this feature is inappropriate for self-improvement programs based on predetermined timing intervals.

Ongoing scientific research has challenged the underlying assumptions and efficacy of some prior-art behavioral modification therapies such as bite-pacing. For example, ingestive behavior scientists have disproved the old assertion that a slowed pace of eating, per se, reduces food consumption (Spiegel, T. A.; Kaplan, J. M.; Tomassini, A.; Stellar, E.; *Appetite*, Vol. 21(2), pages 131–145 (October 1993)). In controlled studies, bite-pacing regimens actually increased food intake over the course of a meal (Yeomans, M. R.; Gray, R. W.; True, S.; *Appetite*, Vol. 29(1), pages 61–76 (August 1997)).

Other self-improvement weight control methods are known, e.g., mindful eating and satiety assessment regimens have been used during mealtime periods, and a variety of intervention techniques have been proposed to control inappropriate eating between meals (the latter including refocusing, visualization, and meditation). These strategies are consistent with a new body of scientific knowledge called Perceptual Control Theory (PCT) that is radically different from behavioral modification theories, such as operant conditioning and stimulus control.

In summary, various single-purpose signaling devices have been disclosed to support the now-discredited behavioral modification method of bite pacing. The cited prompting devices have many limitations in the areas of conspicuousness, user-friendliness, and other operational deficiencies that make them undesirable or ineffective for use in self-improvement programs. The prior art also discloses other weight control methods such as mindful eating, satiety assessment, and intervention techniques to curtail unwanted eating between meals.

3. Objects and Advantages

Accordingly, several objects and advantages of this invention are to provide:

(a) a new and improved attention-focusing device and method, especially one that overcomes the drawbacks of prior-art devices and methods;

(b) an attention-focusing device for repetitive signaling of a plurality of self-improvement regimens in humans;

(c) an attention-focusing device that is inconspicuous in use by virtue of its small size, its shielding of the visual signal from non-users, its provision of a tactile signaling mode, its simplicity of user activation, and an unobtrusive appearance which bears no resemblance to a conventional timing device;

(d) an attention-focusing device that is conveniently and comfortably portable, easily accessible at any time, and usable in any social setting;

(e) an attention-focusing device that can be selectively used in either visual, aural or tactile signaling modes based on user preference and social setting;

(f) an attention-focusing device that is perceived by its user to be non-coercive by virtue of its use of gentle and pleasant signal forms; and (g) an attention-focusing device ergonomically shaped for use as a handheld kinesthetic contact surface in visualization exercises.

Other objects and advantages are to provide:

(a) an attention-focusing device with at least one flat surface adapted for standing on a horizontal surface;

(b) a circuit that is capable of providing a plurality of sets of predetermined, sensibly-distinct, repetitive prompting signals that may be run individually or concurrently for multiple-task, self improvement regimens;

(c) an attention-focusing device with circuitry that prevents accidental activation and causes automatic shut down to preserve battery life; and (d) an exemplary method of use for an attention-focusing device that supports a multiple task weight control program including mindful eating, satiety assessment, and intervention regimens.

Still further objects and advantages will become apparent from the ensuing description and drawings.

SUMMARY

According to the invention we provide a small, inconspicuous attention-focusing device that generates sets of selectable repetitive signals for implementing psychological therapies or other programs for self-improvement. The preferred embodiment provides many user-friendly structural features. These include a small housing unit sized to be comfortably contained within a closed hand, inconspicuously used on a flat surface, and conveniently transported in pocket or purse; a visual sender embedded within the housing unit to shield the signal from direct observation by non-users; and an incurvate surface formed in the housing unit to further shield the visual sender and provide a structural surface for kinesthetic contact in intervention exercises.

The device employs a control circuit that can be flexibly programmed to produce sets of sensibly distinct timing signals of predetermined intervals that may be run individually or concurrently to implement the timing specifications of multiple-regimen programs. The circuitry of a preferred embodiment provides a mechanism for selectable visual, aural, or tactile signaling; a single normally open switch for selecting operational mode, signal type, and off state; and "smart device" features that prevent accidental activation and cause automatic shut down to conserve battery life.

The device further includes an exemplary method of use that implements several related self-improvement regimens (mindful eating, satiety assessment, and intervention exercises) for controlling human body weight.

DRAWINGS

Figures

REFERENCE NUMERALS 10 attention-focusing device
12 housing
14 front
16 back
18 signal port
20 visual sender
22 incurvate surface
24 positioning surface
25 dining table surface
26 user
27 non-users
28 field of view
30 switch port
32 switch
40 circuitry
42 microcontroller
44 power supply
46 timing signal means
50 annunciator
52 capacitors
54 resistor
60 mode selection loop
62 mode A loop
64 mode B loop
66 mode C loop

DETAILED DESCRIPTION

Figure 1A:
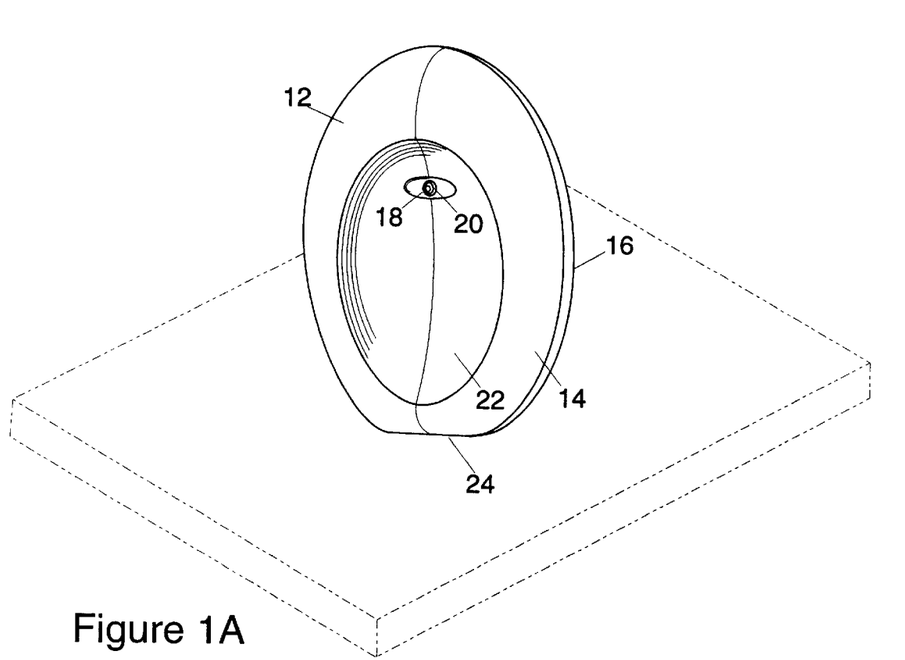
FIG. 1A is a perspective overall view of the preferred embodiment of an attention-focusing device according to the invention in its vertical operating position.
Figure 1B:
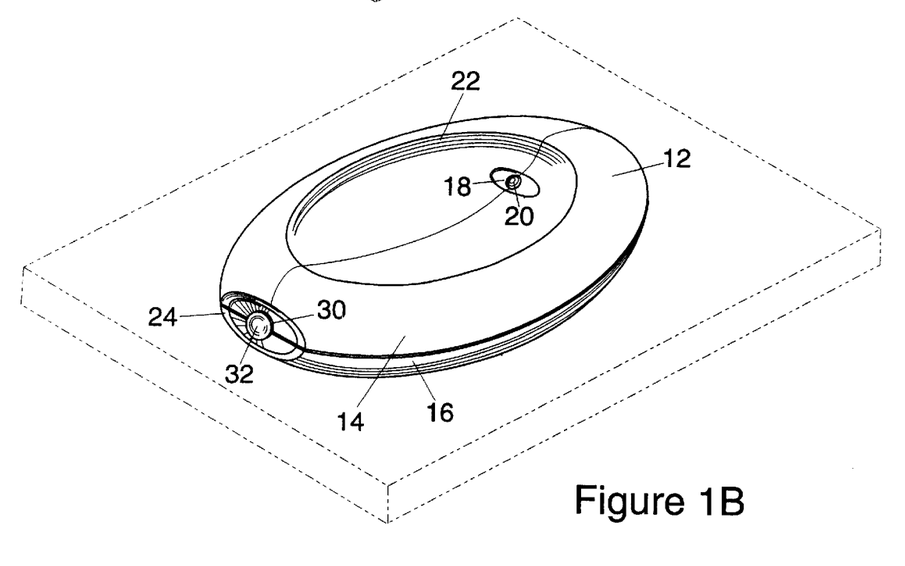
FIG. 1B is a perspective overall view of the preferred embodiment of the device in a horizontal position.
Figure 2:
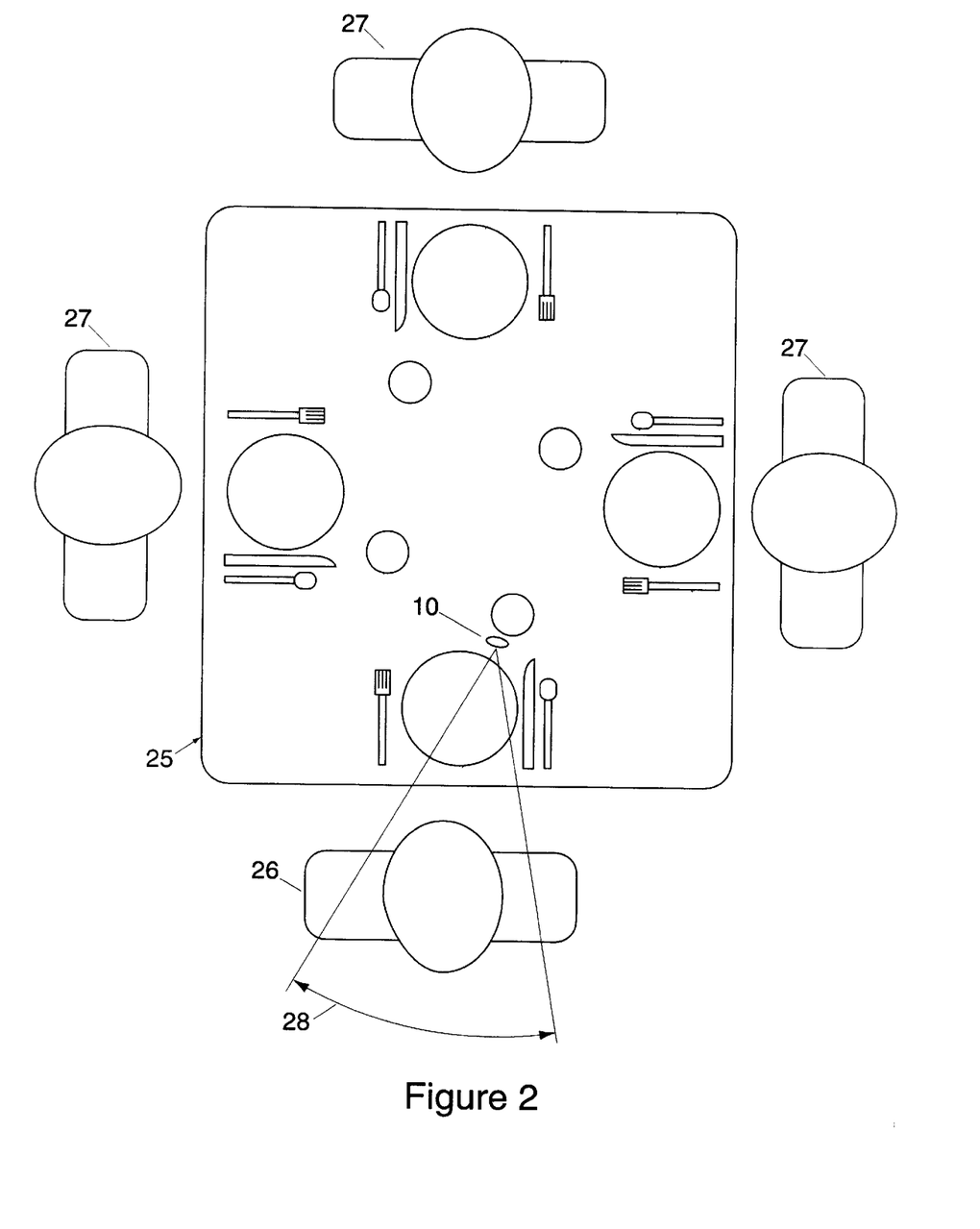
FIG. 2 is a plan drawing of the viewing angles of the preferred embodiment of the device on a dining table surface.
Figure 5:
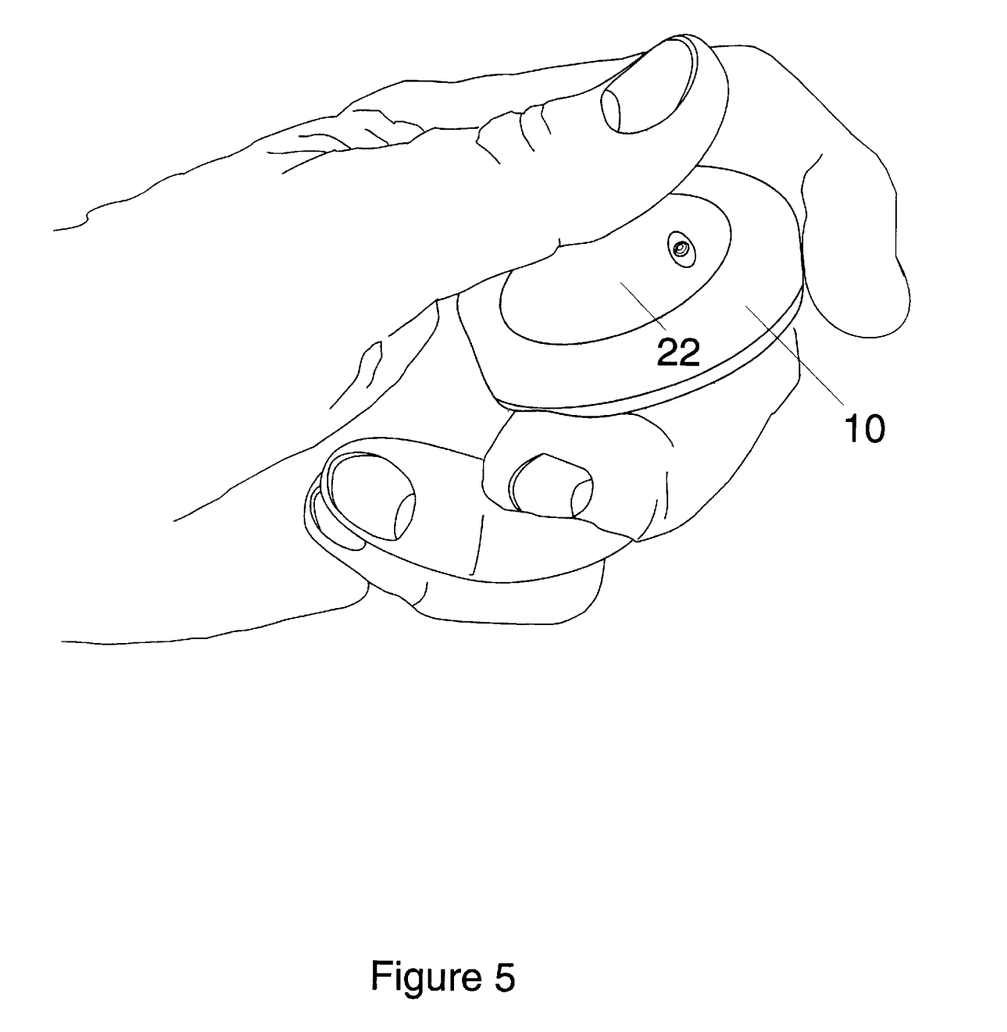
FIG. 5 is a perspective view of the preferred embodiment of the device held as a kinesthetic contact object in a user's hand.

FIGS. 1, 2, 5—Overall Appearance and Functions

A preferred embodiment of an improved repetitive signaling coach for use with self-improvement programs is shown in FIGS. 1A and 1B as attention-focusing device 10. FIG. 1A is a perspective view of device 10 in a vertical operating position, and FIG. 1B is a perspective view of device 10 in a horizontal position. Three salient aspects of device 10, are its housing 12, its circuitry, and its novel methods of use and operation. These make it very effective as an attention-focusing coach for weight-control and other personal improvement programs.

The first major component of device 10 is housing 12 that provides enclosure and structural support for the circuitry. Housing 12 is preferably made of injection-molded plastic and includes two attachable clamshell parts, a front 14 and a back 16.

Less obvious, but more important structural aspects of housing 12 are its exterior size, shape, surface features, and overall appearance that promote discreet operation and user-friendliness. Collectively, the physical characteristics of housing 12 provide critical solutions to the self-consciousness problems noted supra that have inhibited widespread use of attention-focusing devices in self-improvement programs.

A social dining setting serves as the ultimate test of whether an attention-focusing device will achieve threshold user acceptance or be discarded as a source of embarrassment. Audible signal forms are obviously disruptive and inappropriate in social settings. Tactile signaling is more discreet, but many people do not like to feel buzzing vibrations against their bodies. Also, the skin contact requirements of tactile signaling can conflict with various clothing configurations. The ideal silent signal form for social dining use is a visible light in a soothing, non-coercive color such as green. A visible light signal can be very discreet, but only if its view is adequately shielded from non-users. Housing 12 solves this problem by incorporating structure to conceal visual signals from non-users.

A signal port 18 is provided in front 14 for exhibiting signals emitted by a lamp or visual sender 20. Sender 20 is recessed within port 18 and closely surrounded by the plastic of front 14 so that the signal's field of view is constrained. Furthermore, signal port 18 is positioned within an incurvate concave surface 22 molded into the face of front 14. Incurvate surface 22 provides additional shielding of the visual signal's field of view. Housing 12 also has a flat bottom positioning surface 24 for use on a horizontal surface. Surface 24 permits the unit to be stood in the vertical operating position of FIG. 1A, and oriented so that sender 20 is in a direct line with the user's vision and turned away from non-users. As shown in the plan view of a typical dining table 25 (FIG. 2), the field of view 28 of the visual signal is aligned with user 26 and shielded from observation by non-users 27. Another shielded location of use is in the seated user's lap or near the table edge with device 10 oriented in the horizontal position of FIG. 1B to project signals upward.

A switch port 30 (FIG. 1B) is provided in housing 12 for access to a pushbutton switch 32. Switch port 30 is situated in a depression in bottom surface 24. The incurvate depression surrounding switch port 30 and the recessed position of pushbutton switch 32 serve to prevent activation by accidental bumping. Concealing switch 32 within bottom surface 24, as opposed to other locations on the exterior of housing 12, enhances the simple, non-technical appearance and user-friendliness of device 10.

The nominal size of housing 12 is 55 millimeters high by 30 millimeters wide by 15 millimeters thick. This small size allows it to fit within an adult user's closed hand as shown in FIG. 5, and appear passably inconspicuous on a dining table set with glassware and serving dishes. To promote comfortable handling and portability in hand, pocket, or purse, housing 12 is formed in a flattened, ellipsoidal shape, having generally smooth curvilinear surfaces that are free of sharp or protruding edges or abrupt corners.

The lack of liquid crystal or analog clock display, the ellipsoidal shape, and the clean, uncluttered design of housing 12 avoid any resemblance to conventional chronometrical devices, such as cooking timers, stopwatches, and clocks or to other timing mechanisms described in the prior art. Camouflaging the purposes of the preferred embodiment makes it less conspicuous in use. This user-friendly structural appearance increases a person's self-confidence in deploying the device, and improves the likelihood of its successful use.

The ellipsoidal shape of housing 12 and incurvate surface 22 provide structure for an ergonomically conforming fit when device 10 is held with an index finger curled around the top of the elliptical perimeter and the thumb pressed into incurvate surface 22. The structural support and tactile attractiveness that results when held in this manner, as shown in FIG. 5, enables the use of device 10 as a kinesthetic contact object.

Figure 3:
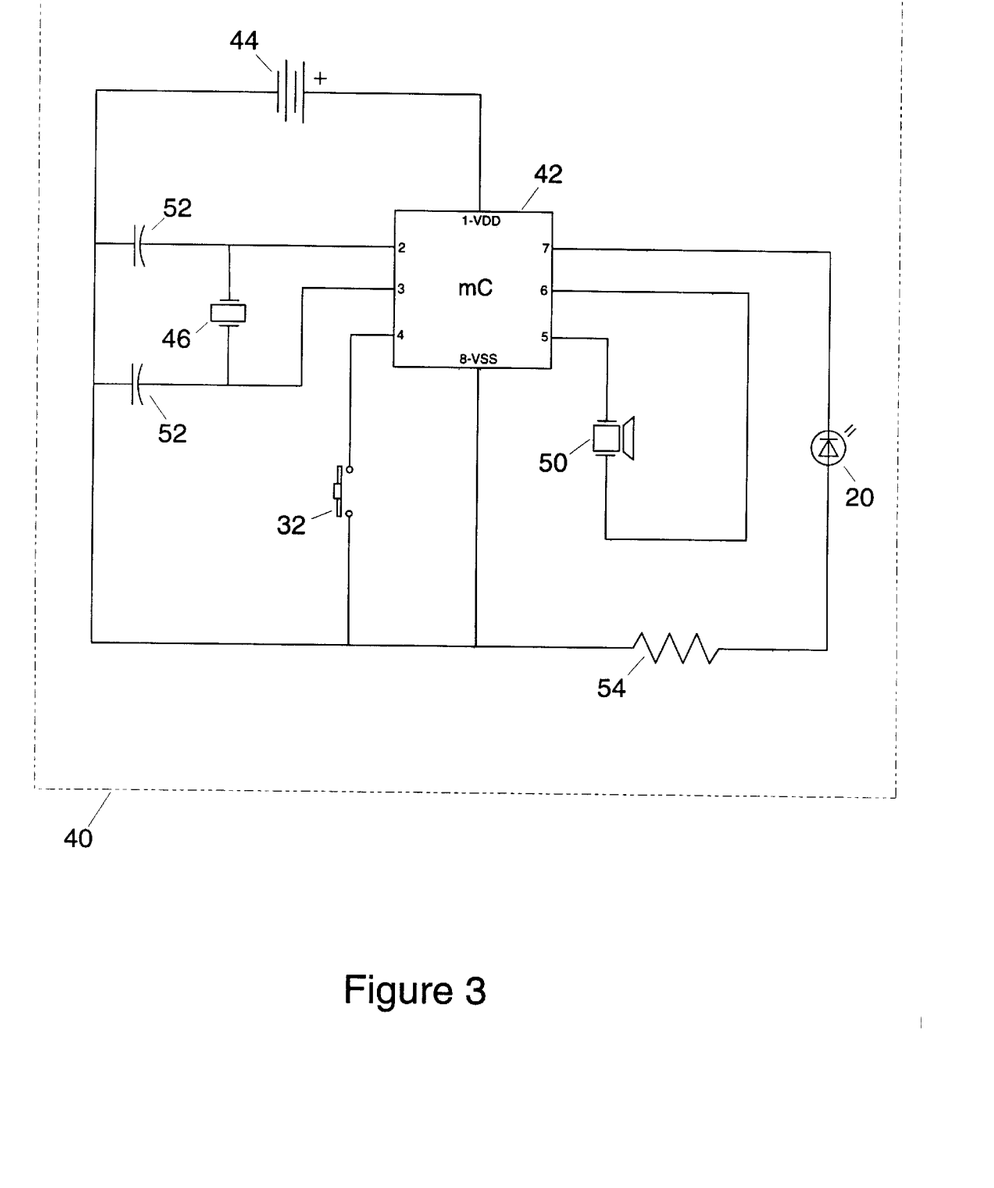
FIG. 3 is a block diagram of the circuitry of the preferred embodiment of the device.

Circuitry—FIG. 3

The second salient aspect of attention-focusing device 10 is its operational circuitry 40 (FIG. 3). The circuit consists of a microcontroller 42 and its support circuitry connected as shown in FIG. 3, all comprised from electronic components well known in the art and readily available from numerous sources. Microcontroller 42 is preferably a programmable digital microcontroller, but a hardwired digital device or even an analog processor may be substituted. The support circuitry includes a power supply 44 that is preferably a battery, and an external clock 46, such as a piezoelectric crystal (32.768 kHz), for providing accurate timing for microcontroller 42. The output sensed by the user includes a visually sensed output emitted by visual sender 20, preferably a pleasing-to-the-eye, green L.E.D., and an aurally or tactilely sensed output through an annunciator 50, such as a signal-switched, multi-mode component manufactured by Tokin America that provides sound and vibratory functions in a single unit. If tactile signaling is not desired, a standard piezoelectric transducer could be substituted to provide aural output. Further, the support circuitry includes a user-operable, normally open switch 32, capacitors 52 (15 pF), and a resistor 54 (160 ohm).

Microcontroller 42 is preferably a programmable digital controller such as an 8-pin, 8-bit, CMOS unit manufactured by Microchip Technology, Inc., with pin placements as indicated in FIG. 3. These programmable digital microcontrollers are small, inexpensive, and readily available. Microcontroller 42 comprises a "microcomputer on a chip" that places the arithmetic and logic controllers along with a read-only memory (ROM) and read-write or scratchpad memory in the same chip package. Microprocessors of this type are typically used as embedded controllers and are programmed during manufacture. These microprocessors can be one-time programmable chips or reprogrammable chips known as EPROMs.

A microcontroller of this class can be flexibly programmed to provide a plurality of timing outputs while also driving a plurality of simple output devices. The techniques for programming microcontroller 42 will vary according to the particular make and model, and are well known in the art. Microcontroller 42 in the preferred embodiment of device 10 is programmed according to the flow chart of FIG. 4.

Microcontroller 42 affords several important advantages for attention-focusing device 10. The logic and memory capacity of microcontroller 42 permits implementation of complex, multiple-regimen, self-improvement programs that were not found in the prior art. Furthermore, factory programming of microcontroller 42 enables production of a variety of application-specific repetitive timing devices for self-improvement, and it can fix the signal timing parameters so a user cannot adjust or defeat them. Finally, microcontroller 42 enables the miniaturization of the attention-focusing device. This is a major factor in reducing conspicuousness, and enhancing user-friendliness.

Switch 32 is a miniature, normally open, tactile switch that is programmed via microcontroller 42 to be the sole user interface for selecting the operating modes of device 10. This simplicity of operation allows even an inexperienced user to select the operating mode without visual observation, permitting it to be activated while discreetly held in a pocket or out of sight under a dining table.

Operation and Use

While the preferred embodiment of device 10 can be factory programmed to support any self-improvement program based on repetitive signaling, the following method of use is presented as one example of a multiple task signaling regimen for human weight control.

In this application, device 10 is programmed (see flow chart of FIG. 4, discussed below) to provide distinct repetitive signals to support three weight-control regimens, namely, Mindful Eating, Satiety Assessment, and Interventions. The Mindful Eating and Satiety Assessment strategies are used during regular meals, whereas the Intervention techniques are used between meals to control eating or deter other obsessive thoughts.

In the Mindful Eating regimen, a signal is generated about every 30 seconds to direct the user's attention to the process of eating and the goal of becoming a controlled eater. The user may choose to take bites of food in concert with these signals but this is not an essential requirement. The principal benefits of the Mindful Eating regimen are enhanced mental awareness of the user's weight control intentions while eating and fuller sensory appreciation of the food. This can promote mental reorganization, goal attainment, and positive shifts to healthy eating behaviors that result in long-term weight control.

The Satiety Assessment regimen is prompted about every five minutes by a different signal that reminds the user to:
1) mentally evaluate bodily states of hunger and satiety,
2) visualize the progressive filling of the stomach cavity to a comfortable point well short of repletion, and
3) decide whether or not to curtail further eating.

Focusing the attention on perceiving the body's hunger and satiety sensations can enable a user to quit a meal earlier and prevent over-consumption.

While the Mindful Eating and Satiety Assessment regimens are signaled at differing intervals, they must be timed concurrently during a meal. In the preferred implementation, both signaling strategies are combined for use at mealtime. While the signals can be selectively rendered in visual, audible, or tactile forms, the preferred embodiment provides two selectable mealtime signaling modes, Mode A for visual signaling, and Mode B for audible signaling.

The Intervention regimen of use involves four cognitive exercises to deter unwanted thoughts between mealtimes: reframing, visualization, refocusing, and meditation.

Reframing teaches a user to identify and confront the improper urge or thought, and then direct the mind to a higher level of mental awareness. From this point of view, the self-aware person is able to better perceive and resolve the conflict between a momentary desire for food gratification and the more fundamental goal of maintaining a healthy body weight.

Visualization is an exercise where the user mentally recreates a vivid vision of a past or imagined situation where the user is powerful, successful, and in complete control. At the peak of this imaging and when the body is experiencing physiological change, the user links this resourceful mental state to a specific kinesthetic action, like squeezing an object held in the hand. This exercise is practiced until the desired "power state" can be summoned at will. The user then "steps into" this forceful visualized state and rejects the unwanted urge.

As discussed above, housing 12 is ergonomically designed to fit comfortably and conformably in the user's hand to facilitate its use as a kinesthetic contact object during visualization exercises. FIG. 5 illustrates device 10 being held in the hand for this purpose with the thumb poised above incurvate surface 22.

After reframing obsessive thoughts of eating and achieving a visualized power state, a refocusing exercise is used to shift the mind's attention to an alternative activity for a period such as 15 minutes. During this refocusing period, the unwanted urge should dissipate and in many cases, disappear completely. If the urge is present after the 15-minute delay, the individual has the option to restart the refocusing exercise for successive periods.

Meditation is another Intervention tool that can reduce feelings of stress and anxiety that can lead to overeating. In meditation, a person sits and allows the mind to become calm and centered for a period of time such as 15 minutes.

The preferred embodiment further supports the Intervention regimen by providing a means for signaling successive 15-minute periods for refocusing or meditation. This is the third selectable operational mode of device 10 and is referred to as Mode C. In this version, the repeating 15-minute signal is provided simultaneously in visible and audible forms, and a flashing "power-on" visual signal is provided every minute to assure a user that the device is energized.

To summarize this exemplary method of use for weight control, device 10 provides three selectable repetitive signaling modes along with ergonomic features supporting kinesthetic contact in visualization exercises. The signaling modes are:

Mode A—Mealtime, Visual Prompts
  (a) Mindful Eating Regimen—30-second signal
  (b) Satiation Assessment Regimen—5-minute signal
Mode B—Mealtime, Aural Prompts
  (a) Mindful Eating Regimen—30-second signal
  (b) Satiation Assessment Regimen—5-minute signal
Mode C—Interventions Visible, and Audible Prompts
  (a) Refocusing Exercise—15-minute signal & 1-minute power-on indication
  (b) Meditation Exercise—15-minute signal & 1-minute power-on indication To choose the operating mode, the user takes attention-focusing device 10 in hand and depresses switch 32 until sensing a selection signal for the desired mode, whereupon the switch is released and the desired mode is selected and active. Microcontroller 42 is programmed to sequence the selection signals about two seconds apart upon depression of switch 32. The sequence and type of selection signal for each mode and the shut down option follows:

First selection signal: Mode A (a single visual signal)
Second selection signal: Mode B (a single audible signal)
Third selection signal: Mode C (a triple audible signal)
Fourth selection signal: Shut down (continuous rapid flash visual signal)

From the shutdown state, switch 32 must be depressed for a minimum of two seconds before the Mode A selection signal is generated. If switch 32 is released before the Mode A selection signal is rendered, the device will not be activated. This feature prevents the inadvertent powering of the unit by bumping or jostling the switch in a pocket or a purse.

For social dining where a user wishes to be discreetly cued for the Mindful Eating and Satiety Assessment regimens, Mode A is selected for silent, visual signaling. To do this, the user depresses switch 32 until the first mode-selection signal is seen. The subsequent immediate release of switch 32 activates Mode A. The user then places device 10, oriented as in FIG. 1A, at an inconspicuous location on the tabletop, and aligns visual sender 20 in the line of sight or, alternatively, it can be positioned as in FIG. 1B and laid in the user's lap. Upon perceiving flashing visual signals from device 10, the user performs the Mindful Eating regimen. A different, steady-on visual signal serves to prompt the Satiety Assessment regimen.

In other mealtime scenarios, such as when eating alone and where audible cueing would be desired and apropos, the user depresses switch 32 until hearing the second mode selection signal. Subsequent immediate release of switch 32 activates Mode B. Device 10 can then be placed on the tabletop, in the lap, or in a pocket as desired. A single audible signal designates the Mindful Eating prompt, while a doubled audible signal signifies the Satiety Assessment prompt.

In another preferred embodiment, a selectable operation mode for tactile signaling is programmed into microcontroller 42 to provide an additional option for discreet prompting. The user-sensible output device can be a single annunciator 50 adapted to selectively produce tactile or aural sensations. In this version, the device is activated in a tactile signaling mode and located in sensible proximity to the user's skin. Intensity or duration of tactile signals can be used to differentiate Mindful Eating and Satiety Assessment prompts.

When the Intervention regimen is needed to deter unwanted thoughts of food between meals, device 10 is held in the hand as indicated in FIG. 5 and used as a tactile contact object during the visualization exercise. Thereafter, the user sets device 10 in operational Mode C to time the refocusing period. In this instance, the user depresses switch 32 until hearing the Mode C selection signal, a triple audible sound. The subsequent immediate release of switch 32 activates Mode C. Simultaneous visual and audible signals are used to indicate the conclusion of each 15-minute refocusing period. Device 10 is set in exactly the same manner to time 15-minute meditation periods, another form of Intervention. To assure the user that device 10 is indeed in the 15-minute timing Mode C, microcontroller 42 is programmed to generate a briefly flashing confirmation signal every minute during the 15-minute period.

When the user desires to shut down device 10 from use in Modes A, B, or C, switch 32 is simply depressed and released. This generates a rapidly flashing mode selection signal, indicating that the unit is ready for shutdown. Should the user forget to shut down device 10 while in Mode A or Mode B, microcontroller 42 is programmed to effect automatic shutdown after one hour to conserve battery power. Similarly, when left operating in Mode C, programmed shutdown will occur after three hours of activation.

Figure 4:
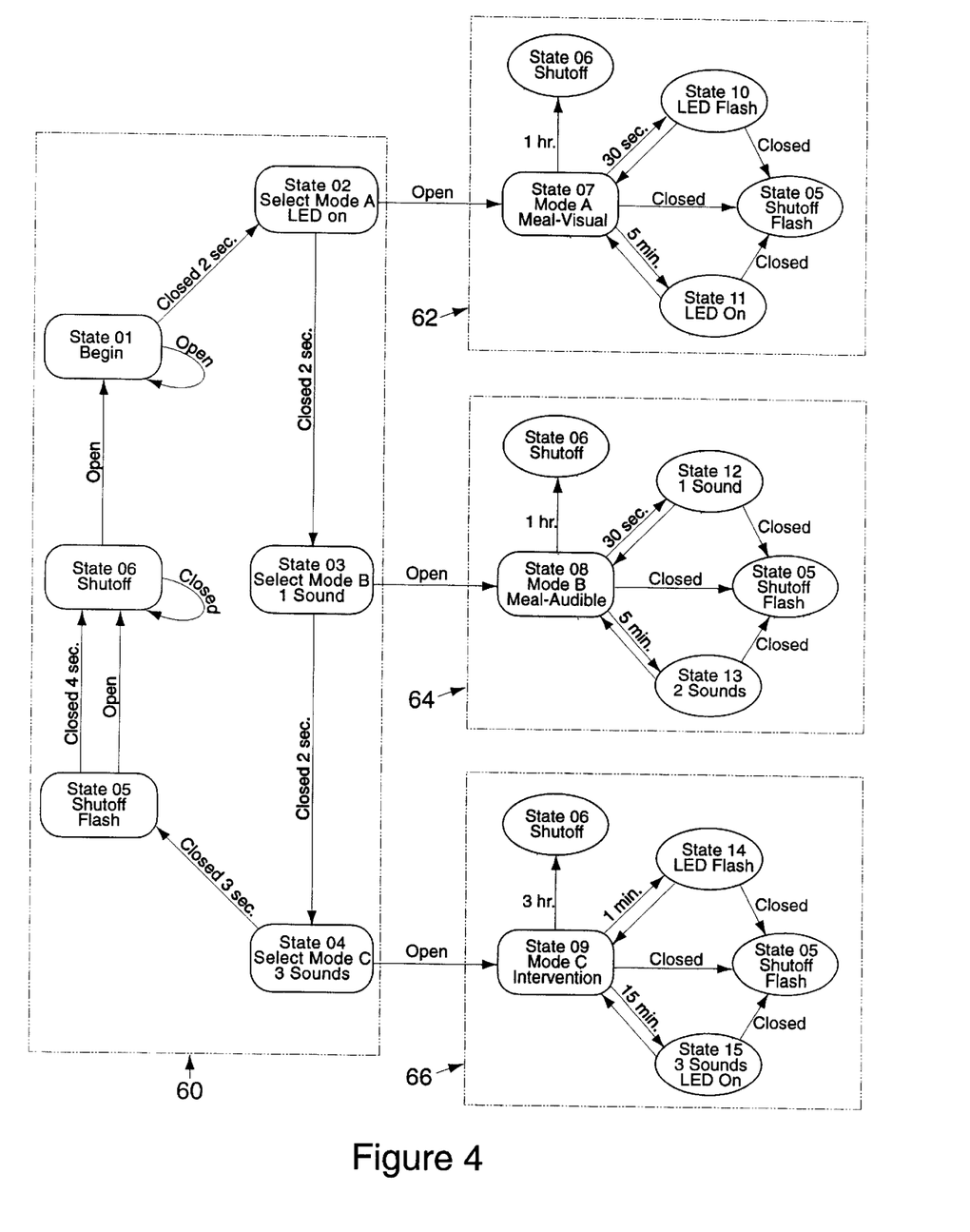
FIG. 4 is a flow chart diagram of the logic in the preferred embodiment of the device.

Flow Chart—FIG. 4

The microcontroller 42 in the preferred embodiment is programmed according to the logic diagram of FIG. 4. As an overview, block 60 contains the logic controlling the selection of the different operating modes and the shutoff-state. Blocks 62, 64, and 66 respectively portray the control logic for Modes A, B, and C described above. Each block of FIG. 4 will be discussed in turn. References to circuitry components below pertain to FIG. 3.

Starting at block 60, State 01, Begin, the device is shut down but Microcontroller 42 is continuously monitoring (signified by the small loop labeled "Open") to determine if normally open switch 32 has been depressed. When microcontroller 42 senses a closed state of switch 32, microcontroller 42 resets a timer to measure the time switch 32 remains closed. If switch 32 stays closed for less than two seconds, microcontroller 42 interprets this event as an inadvertent actuation of switch 32 and reverts back to monitoring the position of switch 32.

When switch 32 remains depressed for more than two seconds while in State 01, control shifts to State 02, the Mode A selection signal, that is indicated by a steady on signal from visual sender 20. If switch 32 is released after two seconds and before four seconds have elapsed while in State 01, microcontroller 42 is programmed to pass control to the first operation mode, designated as State 07, Mode A, Meal-Visual in block 62.

Block 62 provides visual prompting of two concurrently timed signals. In the weight control method, one signal indicates a first prompting event, Mindful Eating, that occurs about every thirty seconds. This signal is indicated by visual sender 20 flashing at a frequency of eight Hertz for two seconds (State 10). A different signal indicates a second prompting event, Satiety Assessment, occurring about every five minutes to focus attention on assessing the level of satiety. This signal is indicated by continuous illumination of visual sender 20 for four seconds (State 11). In the event that control remains in block 62 for one hour, execution shifts directly to State 06, Shutoff, to conserve battery life. If switch 32 is closed at any time while control resides in block 62, execution immediately shifts to block 60, State 05, the Shutoff Flash and continues until the switch is released or four seconds elapse, whichever occurs first. Thereafter device 10 will be in State 06, Shutoff.

When switch 32 remains depressed for more than four seconds from State 01, control shifts to State 03, the Mode B selection signal, that is expressed as a single audible sound. If switch 32 is released after four seconds and before six seconds have elapsed while in State 01, microcontroller 42 is programmed to pass control to the second operation mode, designated as State 08, Mode B, Meal-Audible in block 64 (FIG. 4).

Block 64 provides aural prompting of two concurrently timed signals. In the weight control method, one signal indicates a first prompting event, Mindful Eating, occurring about every thirty seconds. This signal is indicated by a single sound (State 12) from annunciator 50. A different signal indicates a second prompting event, termed Satiety Assessment occurring about every five minutes. This signal is indicated by a double sound (State 13) from annunciator 50. Microcontroller 42 may be programmed to vary the characteristics of the two repetitive aural signals of annunciator 50 so they are easily distinguished, pleasant-sounding, and discreet in volume. In the event that control remains in block 64 for one hour, execution shifts directly to State 06, Shutoff, to conserve battery life. If switch 32 is closed at any time while control resides in block 64, execution immediately shifts to block 60, State 05, the Shutoff Flash, and continues there until the switch is released or four seconds elapse, whichever occurs first. Thereafter device 10 will be in State 06, Shutoff.

In another embodiment, Microcontroller 42 may be programmed to selectably operate a different annunciator 50, such as a multimode device manufactured by Tokin America, that provides signal-switched, sound and vibratory functions in a single unit.

When switch 32 remains depressed for more than six seconds from State 01, control shifts to State 04, the Mode C selection signal, that is expressed as a triple audible sound. If switch 32 is released after six seconds and before nine seconds have elapsed from State 01, microcontroller 42 interprets this event as a command to enter a third operation mode, designated as State 09, Mode C, Intervention, in block 66 (FIG. 4).

Block 66 generates a one-second, four-Hertz flash of visual sender 20 every minute (State 12) to assure the user that device 10 is still operating, and provides simultaneous visual and aural signals every fifteen minutes (State 15) to time refocusing or meditation periods. The 15-minute signals are a triple audible sound from annunciator 50 and a four-second, four-Hertz flash from visual sender 20. In the event that control remains in block 66 for three hours, execution shifts directly to State 06, Shutoff, to conserve battery life. If switch 32 is closed at any time while control resides in block 66, execution immediately shifts to block 60, State 05, the Shutoff Flash and continues there until the switch is released or four seconds elapse, whichever occurs first. Thereafter device 10 will be in State 06, Shutoff.

When switch 32 remains depressed in block 60, State 01, for more than nine seconds, microcontroller 42 terminates the mode selection process by entering State 05, Shutoff Flash, and continues there until the switch is released or four seconds elapse, whichever occurs first. Thereafter device 10 will be in State 06, Shutoff.

The attention-focusing coach provides a weight-challenged user with a valuable tool for restructuring the mental processes that drive food consumption.

For example, on a typical day, a user arises and engages in a period of seated meditation. This is an opportunity to focus upon, among other things, the intention of being a mindful and controlled eater during the coming day. The meditation period is initiated with an empowering visualization exercise while holding the coach in hand, and the meditation period is timed by setting the unit in Mode C, Intervention.

At the breakfast table, the coach is held in hand for a brief visualization exercise to mentally set up the eating process. The unit is then set in either mealtime eating Mode A or Mode B as appropriate, and placed on the table in front of the user. If eating in a social setting, Mode A, visual signaling, will provide inconspicuous use. When eating alone, Mode B, aural signaling, is an option.

With every 30-second Mindful Eating signal, a bite of food is taken and thoroughly enjoyed in the awareness that eating is now a mindful, rather than mindless, process. The utensil is grounded on the plate while the bite of food is fully savored. This process repeats until the user sees or hears the unique signal for Satiety Assessment after five minutes. At this point the user interrupts eating and mentally inquires into the state of the body's natural signals of hunger and food satisfaction. Has hunger diminished—how much? Can belly distention be felt? Can the filling of the stomach be imagined progressing towards its point of satisfaction, say two-thirds full? Shall eating continue based on residual hunger or should it be ceased? At the end of this or subsequent satiety assessments, the user ceases eating when feeling the need for food is physiologically satisfied. In most cases, the volume of food consumed will be much less than when the user is eating ad libitum, and yet the user will feel fully satisfied.

The eating coach will be similarly used to promote mindful eating and satiety assessment during other food consumption periods during the day. For some people this may be at lunch and dinner but others may eat on different schedules according to their perceptions of physiological hunger.

At some point during the day, the user may be confronted with a desire to eat that is not based on hunger. These modes of eating stem from deeply engrained perceptual control systems that vary widely from user to user. These forms of inappropriate food consumption are frequently based on internal mental conflict that is temporarily assuaged by the comforting feelings of eating. Diminishing the impact of such "emotional eating" requires a reorganization of mental processes. To promote such restructuring, the user needs to learn skills to self-observe such situations and then intervene with a new approach based on positive weight control intentions.

For instance, suppose the weight-challenged user has just finished a meal and then walks past a bakery shop. An aroma of fresh-baked glazed donuts momentarily captivates the user. The user quickly reframes this situation by asking, "Is this real hunger, or are these sensations a product of my unwanted mental control systems that have led me to misuse food in the past?" It the answer is, "No, this is not real hunger", a refocusing exercise is pursued. Here, the user reaches in pocket, grasps the eating coach firmly in hand and visualizes a practiced power-image of a past or imagined situation where they have been in successful control of their life. The user then mentally "steps into" and becomes this positive power-image. In this masterful mental state, the user mentally revisits new desired intentions such as becoming a mindful, controlled eater, and avoiding inappropriate eating. Finally, the user sets the eating coach in Mode C, Intervention to time a 15-minute refocusing period during which another activity is pursued. Usually, the urge to eat will have subsided by the end of the refocusing period.

Thus, the eating coach and its proposed methods of use in Mindful Eating, Satiety Assessment, and Intervention regimens describe a comprehensive weight management program to assist users in fundamental reorganization of their minds and their relationship to food. The eating coach is an integral tool in this process, conveniently available day or night to assist when needed.

Conclusions, Ramifications, and Scope

From the above the reader will see that our improved attention-focusing coach solves the critical issues of conspicuousness, user-friendliness, and other operational shortcomings found in the prior art. These drawbacks have greatly inhibited the adoption and widespread use of such signaling devices in self-improvement programs until now.

Features allowing discreet operation of our coaching device include a miniaturized size that makes it unobtrusive in use and concealable within a closed human hand; a structure that shields the visual signal from non-users; a silent, tactile signaling option; simple, hidden activation via a single switch; a non-technical appearance that camouflages its purpose and avoids resemblance to other timing mechanisms; and a mode of operation that does not require manual interaction.

Other user-friendly attributes that foster use of the coach include a small size and rounded shape that allow comfortable portability and convenient access at any time; gentle, non-coercive signal forms; an easy to learn, single switch interface; selectable visual, aural, or tactile signaling modes; a structure configured for kinesthetic contact during visualization exercises, and "smart device" circuitry features to prevent accidental activation and extend battery life.

A major advantage lies in providing a microcontroller-based circuit that can be flexibly programmed to distinctively signal a plurality of differing repetitive timing intervals that may be run individually or concurrently. This enables the implementation of a multiple-objective program, and, by extension, the further ability to customize the same basic device to serve a variety of self-improvement applications. Factory preprogramming the microcontroller also assures that users will be unable to defeat the predetermined timing intervals of various regimens.

The flexibility of using this attention-focusing device in multiple-regimen programs is illustrated by a novel weight control system that combines Mindful Eating, Satiety Assessment, and Intervention methods.

Although the description of the preferred embodiment contains many specifics, these should not be construed to limit the scope of the invention. Many variations are possible, as now will be indicated.

Other exterior forms consistent can be easily envisioned. These include toy figures for use by children; disguised forms in the shape of a lipstick case, make-up container, fountain pen; or the incorporation of the device within other small personal appliances, such as wireless pagers, memo recorders, key chain fobs, car or personal security alarms. Similarly, the kinesthetically pleasing-to-the-hand and comfortably portable housing shape in the currently preferred embodiment, including its conforming "thumbprint" depression, portrays one option only, and does not preclude different kinesthetically pleasing shapes.

While housing 12 of the preferred embodiment is specifically designed for use on a horizontal surface or in a pocket, alternative means of support can be used, such as hook-and-loop fabrics, magnets, straps, hooks, and clips for securing the device to other surfaces. Moreover, the device housing can be manufactured in an array of colors and from many different materials other than injection-molded plastic such as metals, nylon, fiberglass, rubber, leather, cloth, etc.

The logic diagram of FIG. 4, used in the preferred embodiment, is provided merely as one example for implementing the selected self-improvement regimens via the attention-focusing device. Subject to the limitations of the microcontroller, the device can be programmed to implement any timing interval or intervals, as well as all combinations of such intervals. Likewise, the use of particular visual, aural or tactile signals of specific length, type, frequency, intensity or tonality in the currently preferred embodiment are not intended to limit other signal options. The preferred circuitry embodiment discussed at length above does not preclude other obvious embodiments, the use of a speaker or vibrating motor as the annunciator, the inclusion of digital voice signaling, etc. The mention or inference of using particular parts in the preferred circuitry embodiment in no way limits future substitution of components that provide the same functionality.

The attention-focusing coach has myriad uses for implementing self-improvement programs, self-treatment psychological therapies, mental meditation exercises, and other educational methods based on the provision of a plurality of repetitive cueing signals. For example, in addiction withdrawal programs, our device can be programmed to a prompt a selectable group of progressively longer delays. Similarly, our device will find uses in treating psychological problems, such as obsessive-compulsive disorders, phobias, and anger control where treatments often have subjects refrain from performing certain actions for progressively longer periods or, in other cases, to expose themselves to imagined dangers for progressively longer periods. The device is easily adaptable to supply customized prompting signals for clinical psychology experiments based upon cognitive, behavioral or perceptual control theories.

Some other uses include prompting weightlifters on the duration and sequencing of their routines, signaling yoga students for the sequencing and duration of their poses, and using it as a meditation coach.

Thus, the scope of the invention should be determined by the appended claims and their legal equivalents, rather than by the examples given.

What is claimed is:

1. An attention-focusing device for supplying a plurality of sets of prompting signals for a plurality of corresponding self-improvement regimens, comprising:
   (a) a circuit means having a plurality of different operational modes for producing a respective plurality of sets of sensible prompting signals, each set of sensible prompting signals being (1) repetitive, (2) occurring at fixed, predetermined intervals, said intervals being non-alterable by a user, and (3) different from each other set of sensible prompting signals;
   (b) an output means for generating a visible and an audible output that can be sensed by a user proximate to said device, said output means being arranged so that said visible output is not sensible to others less proximate to said device than said user;
   (c) at least one user-operable input switch for enabling a user to cause said circuit means to enter a selected one of said plurality of said different operational modes; and
   (d) a housing means which contains said circuit means, said output means, and said switch;
   (e) said housing means being sized and shaped to fit conformably within a closed human hand, allow comfortable portability in a pocket or a purse, and camouflage the operation and purpose of said device;
   (f) said housing means further having at least one flat bottom positioning surface for supporting said device on a horizontal surface so as to permit said device to be stood in an operating position and oriented so that that said visible output is in a direct line with a user's vision and turned away from non-users;
   whereby a user can unobtrusively and discreetly transport, deploy, and operate said device in a variety of settings.

2. The device of claim 1 wherein said circuit means is responsive to the length of time said switch is held depressed so said selected operational mode is selected by holding said switch depressed for different time intervals.

3. The device of claim 1 wherein said circuit means is arranged to provide a plurality of operational modes in response to inputs from said switch, each operational mode supplying one of said sets of sensible prompting signals and an output selected from the group consisting of a visual sensation, an aural sensation, and a tactile sensation.

4. The device of claim 1 wherein said housing means has a side surface with an incurvate or concave portion with said visible output in said incurvate portion so as to aid in shielding said visible output.

5. The device of claim 1 wherein said circuit means is arranged to provide a plurality of concurrently operated sets of said repetitive prompting signals.

6. The device of claim 1 wherein said visible output means is a light-emitting diode.

7. The device of claim 1 wherein said visible output means is a light-emitting diode and said audible output means is a tone generator.

8. The device of claim 1 wherein said circuit means is arranged to produce either (a) a first set of prompting signals comprising a first repetitive signal having a relatively short, fixed period for disrupting unconscious eating and focusing the user's attention on eating mindfully and a second concurrent repetitive signal of a different nature than said first signal and having an intermediate fixed period to direct the user to perform a satiety assessment test, or (b) a second timing signal having a relatively long fixed period to inform the user of the conclusion of an intervention period or a meditation period.

9. An attention-focusing device for supplying a plurality of sets of prompting signals for a plurality of related human weight control regimens, comprising:
   (a) a circuit, a plurality of stored instructions, and a portable power source,
   (b) said circuit having a plurality of different operational modes for producing a plurality of different respective sets of visible and audible signals, each set of signals being (1) repetitive, (2) occurring at fixed, predetermined intervals, said intervals being non-alterable by a user, and (3) different from each other set of sensible prompting signals;
   (c) an annunciator and a visual sender for generating a visible output sensible by a user proximate to said device, while said visible output remains inconspicuous to others less proximate to said device than said user;
   (d) at least one user-operable input switch for enabling a user to cause said circuit to enter a selected one of said plurality of different operational modes; and
   (e) a housing which contains said circuit, said annunciator, said visual sender, and said switch, said housing being sized and shaped to:
      i) fit conformably within a closed human hand;
      ii) allow comfortable portability in pocket or purse;
      iii) camouflage the operation and purpose of the device;
      iv) provide an incurvate side surface containing said visible output and at least one flat bottom positioning surface for supporting said device on a horizontal surface so as to permit said device to be stood in an operating position and oriented so that that said incurvate side surface with said visible output is in a direct line with a user's vision and turned away from non-users; and
      v) furnish a visually-sensible output that is discreetly sensible to a seated user while being inconspicuous to other sitting humans proximate to said user when said device is on a horizontal dining surface or a user's lap; whereby a user can unobtrusively transport, deploy, and operate said device in a variety of settings.

10. The device of claim 9 wherein said circuit is responsive to the length of time said switch is held depressed so said selected operational mode is determined by said length of time said switch is depressed.

11. The device of claim 9 wherein said circuit is arranged to provide a plurality of operational modes in response to inputs from said switch, each operational mode supplying one of said sets of visible and audible prompting signals, and an output selected from the group consisting of a visual sensation, an aural sensation, and a tactile sensation.

12. The device of claim 9 wherein said circuit is arranged to provide a plurality of concurrently operated sets of said repetitive prompting signals.

13. The device of claim 9 wherein said visible output means is a light-emitting diode.

14. The device of claim 9 wherein said circuit is arranged to produce (a) a first set of prompting signals comprising a first repetitive signal having a relatively short, fixed period for disrupting unconscious eating and focusing the user's attention on eating mindfully and a concurrent second repetitive signal having a different nature than said first signal and an intermediate fixed period to direct the user to perform a satiety assessment test, or (b) a second timing signal having a relatively long period to inform the user of the conclusion of an intervention period or a meditation period.

15. A method of focusing a user's attention for human body weight control, comprising:

(a) providing an attention-focusing device programmed to have a plurality of different operational modes arranged to produce a plurality of respective sets of repetitive fixed-interval sensible prompting signals for a plurality of corresponding weight control regimens, each set of signals being repetitive and occurring at fixed, predetermined intervals, said intervals being non-alterable by a user, said signals comprising visible and audible outputs sensible by a user proximate to said device, where said visible output is inconspicuous to others less proximate to said device than said user; said device having a flat bottom positioning surface for supporting said device on a horizontal surface so as to permit said device to be stood in an operating position and oriented so that that said visible output is in a direct line with a user's vision and turned away from non-users;

(b) configuring said device to provide a user-sensible output selected from the group consisting of a visual sensation, an aural sensation, and a tactile sensation;

(c) setting said device to select one of said different operational modes so as to provide one of said sets of repetitive, fixed-interval sensible prompting signals for at least one of said weight control regimens, (d) placing said device at a location in sensible proximity to a user; and (e) perceiving said repetitive prompting signals and performing at least one of said weight control regimens in response to said signals.

16. The method of claim 15 wherein said device is set to provide two concurrently operated sets of said repetitive prompting signals for prompting of mindful eating and satiety assessment events.

17. The method of claim 15 wherein said location is selected from the group consisting of a horizontal dining surface and a seated user's lap.

18. The method of claim 15 wherein said device has an incurvate surface, and further including grasping said device in the hand with the thumb contacting said incurvate surface of said device while a mental visualization exercise is conducted.

19. The method of claim 15 wherein said device is arranged to produce (a) a first set of prompting signals comprising a first repetitive signal having a relatively short, fixed period for disrupting unconscious eating and focusing the user's attention on eating mindfully and a concurrent second repetitive signal having a different nature than said first signal and an intermediate fixed period to direct the user to perform a satiety assessment test, or (b) a second timing signal having a relatively long period to inform the user of the conclusion of an intervention period or a meditation period.

20. The method of claim 15 wherein at least one of said weight control regimens is selected from the group consisting of mindful eating, satiety assessment, intervention, and meditation.

\* \* \* \* \*